Dec. 21, 1965 A. P. FEGLEY 3,225,257
HIGH SPEED DIRECT CURRENT VOLTAGE FAULT
SENSING, INDICATING AND LOAD
PROTECTING APPARATUS
Filed Oct. 9, 1962 4 Sheets-Sheet 1

INVENTOR.
ALBERT P. FEGLEY
BY
ATTORNEY

INVENTOR.
ALBERT P. FEGLEY

Dec. 21, 1965   A. P. FEGLEY   3,225,257
HIGH SPEED DIRECT CURRENT VOLTAGE FAULT
SENSING, INDICATING AND LOAD
PROTECTING APPARATUS
Filed Oct. 9, 1962   4 Sheets-Sheet 4

INVENTOR.
ALBERT P. FEGLEY
BY
Charles R. Lepchinsky
ATTORNEY

United States Patent Office 3,225,257
Patented Dec. 21, 1965

3,225,257
HIGH SPEED DIRECT CURRENT VOLTAGE FAULT SENSING, INDICATING AND LOAD PROTECTING APPARATUS
Albert P. Fegley, Birchrunville, Pa., assignor to Burroughs Corporation, Detroit, Mich., a corporation of Michigan
Filed Oct. 9, 1962, Ser. No. 229,328
20 Claims. (Cl. 317—33)

This invention relates to direct current fault sensing, indicating and protecting apparatus and more particularly to high speed apparatus for rapidly sensing a fault in one or more direct current regulators, and for indicating which direct current voltage regulator contains a fault and whether the fault causes an under-voltage or an over-voltage, and for protecting the devices supplied with power by the direct current regulators by simultaneously or sequentially disabling each direct current regulator.

Direct current power is generally used to supply operating potential to electronic equipment and is usually obtained by rectifying a source of alternating current power and then regulating the rectified power to provide stable direct current voltages. Heretofore in the prior art; fuses, circuit breakers, and voltage sensitive relays have been used to protect the electronic circuits, being supplied with direct current power, from power system malfunctions. Fuses and circuit breakers only protect against excessive currents whereas many power system malfunctions result in excessive or low voltages. Accordingly, voltage sensitive relays give a more realistic protection against power system malfunctions. The operating speed of the voltage sensitive relays, however, is approximately fifty milliseconds and the operating speed of fuses and circuit breakers is approximately five milliseconds. Thus, the operating speed of these prior art devices is too slow to insure protection of present day circuits and circuit components such as transistors, semiconductor diodes, printed circuits, miniature components, etc. Accordingly, apparatus for disabling a direct current power source within a few microseconds after a fault or malfunction affects the voltage level of the direct current power is very desirable.

Also, large electronic systems, such as electronic computers, require a plurality of voltage levels which necessitates using a plurality of direct current regulators. In the event of a malfunction of a single regulator, it is not only desirable that the regulator be disabled or inhibited within a few microseconds, but that all other regulators are simultaneously disabled. In some cases it is even necessary that the regulators be disabled in a predetermined sequence. In order to keep trouble shooting and maintenance time to a minimum, an indication of which regulator system malfunctioned and whether the malfunction resulted in an over-voltage or an under-voltage is also highly desirable.

Accordingly, an object of this invention is to provide an improved high speed direct current voltage fault sensing apparatus.

Another object of this invention is to provide apparatus for disabling a direct current power source within a few microseconds after a fault or malfunction affects the voltage level of the direct current power source.

A further object of the present invention is to provide apparatus for disabling all of a plurality of direct current power sources within a few microseconds after a fault or malfunction affects the voltage level of any one of the direct current power sources.

Another object of this invention is to provide apparatus for sequentially disabling a plurality of direct current power sources within a few microseconds after a fault or malfunction affects the voltage level of one of the power sources.

A further object of the present invention is to provide apparatus for indicating which of a plurality of direct current regulators malfunctions and whether the malfunction causes an over-voltage or an under-voltage.

Still another object of this invention is to provide improved high speed direct current voltage fault sensing, indicating, and load protecting apparatus with a five microsecond operating time.

A still further object of the present invention is to provide high speed fault sensing, indicating, and load protecting apparatus which senses an over-voltage or an under-voltage in the output of a plurality of direct current voltage regulators caused by a fault or malfunction in one or more of the regulators.

These and other objects of the present invention are accomplished by providing a high speed direct current voltage sensing, indicating, and load protecting apparatus to be utilized in conjunction with a plurality of power sources of regulated direct current voltage. A plurality of voltage dividers are utilized for deriving stable adjustable direct current under-voltage and over-voltage reference levels to be compared with the regulated voltage output of each direct current voltage regulator. Individual semiconductor sensing means are coupled to the regulated voltage output of each direct current regulator. Each sensing means is adapted to receive the under-voltage and over-voltage reference level associated with its regulated voltage level for providing a first output whenever the magnitude of the regulated voltage level becomes less than the magnitude of the under-voltage reference level and for providing a second output whenever the magnitude of the regulated voltage level becomes greater than the magnitude of the over-voltage reference level. The first output of each sensing means is indicative of a fault in its associated direct current regulator which causes the regulated output voltage to decrease more than a predetermined amount and the second output of each sensing means is indicative of a fault in its associated direct current regulator which causes the regulated output voltage to increase more than a predetermined amount. Indicating means are coupled to, and adapted to receive, the first and second output of each of the sensing means providing an indication of which of the regulated power sources contains a fault and whether the fault causes an over-voltage or an under-voltage in the voltage regulator output. Circuit protecting means are provided which are responsive to the first and second outputs of the sensing means for inhibiting sequentially or simultaneously all of the regulated power sources whenever a fault occurs in at least one of the voltage regulators.

The exact nature of this invention as well as other objects and advantages thereof will be readily apparent from consideration of the following detailed description relating to the annexed drawings in which.

Figure 1:
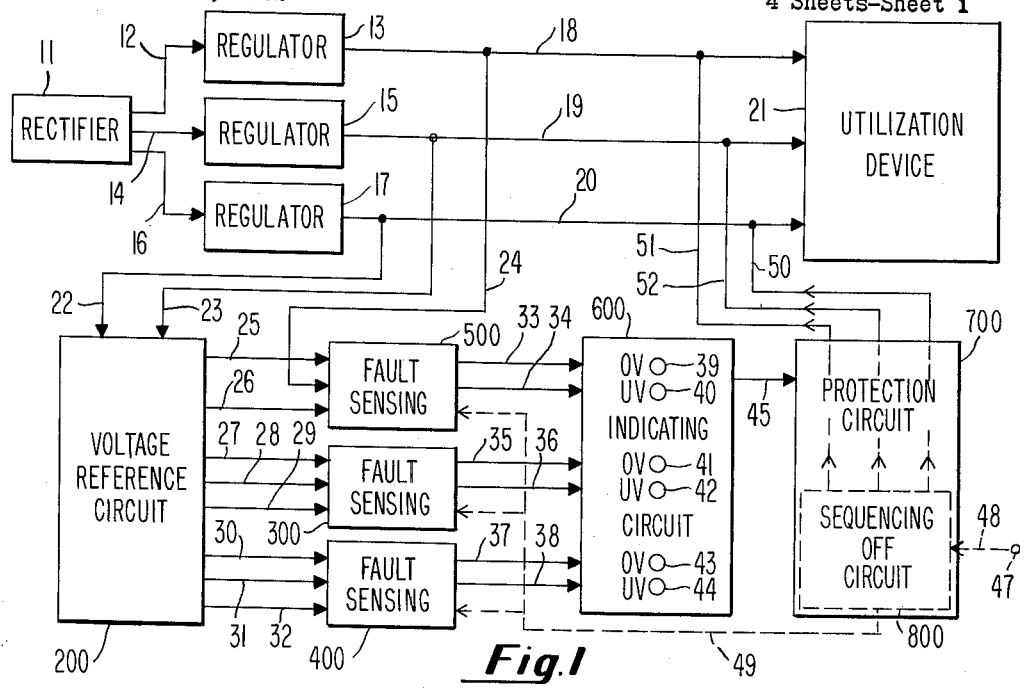
FIGURE 1 illustrates in block diagram form a preferred embodiment of the present invention.

Referring now to the drawings, there is shown in FIGURE 1, which illustrates in block diagram form a preferred embodiment of the present invention, rectifiers 11 which convert a source of alternating power (not shown) into a low positive unregulated rectified direct current voltage which is applied by the lead 12 to a low positive voltage regulator 13, a high positive unregulated rectified direct current voltage which is applied by lead 14 to a high positive voltage regulator 15, and a negative unregulated rectified direct current voltage which is applied by lead 16 to a negative voltage regulator 17. The regulated direct current outputs of each of the voltage regulators 13, 15, and 17 are applied by way of leads 18, 19, and 20 respectively to a utilization device 21 which may be any electronic equipment such as an electronic computer.

A voltage reference circuit 200 provides adjustable direct current under-voltage and over-voltage reference levels which are compared with the output level of each of the voltage regulators 13, 15, and 17. The regulated output of the high positive regulator 15 is coupled to the voltage reference circuit 200 by way of the lead 23 and the regulated output of the negative regulator 17 is also applied to the voltage reference circuit 200 by way of the lead 22. The magnitude of these voltage levels are reduced by the voltage reference circuit 200 to a magnitude more easily compared with the over-voltage and under-voltage reference levels. The regulated output of the low voltage regulator 13 is sufficiently small in magnitude so that it is connected directly to its associated fault sensing circuit 500 by way of the lead 24.

The low positive voltage over-voltage reference signal is applied to the low positive sensing circuit 500 by way of the lead 25 and the under-voltage reference level by way of the lead 26. The over-voltage reference level and the under-voltage reference level for the high positive voltage fault sensing circuit 300 is supplied from the voltage reference circuit 200 by way of the leads 27 and 29 respectively. The regulated output of the high voltage regulator 15 is reduced in magnitude by the voltage reference circuit 200 and applied by the lead 28 to the high voltage fault sensing circuit 300. The negative over-voltage reference level and under-voltage reference level is applied from the voltage reference circuit 200 to the negative voltage fault sensing circuit 400 by way of the leads 30 and 32 respectively. The regulated output of the negative voltage regulator 17 is reduced in magnitude by the voltage reference circuit 200 and applied by way of the lead 31 to the negative voltage fault sensing circuit 400. A voltage reference circuit 200 was constructed, which is described in detail hereinbelow in conjunction wtih FIGURE 2, wherein the over-voltage and under-voltage reference levels changed less than 0.2 volt over a 60° centigrade temperature variation. With the voltage regulators 13, 15 and 17 designed for ±1% regulation, the over-voltage and under-voltage reference levels were set at ±0.5 volts of nominal regulator output voltage.

The fault sensing circuits 300, 400 and 500 are designed to provide a first output on the leads 34, 36, and 38 respectively whenever the magnitude of the regulated voltage of their associated voltage regulators 15, 17, and 13 respectively becomes less than the magnitude of the under-voltage reference level applied thereto, and to provide a second output on the leads 33, 35 and 37 respectively whenever the magnitude of the regulated voltage of their associated voltage regulators becomes greater than the magnitude of the over-voltage reference level applied thereto. For example, when a fault occurs in the low positive regulator 13 that causes its regulated output, appearing on the lead 18, to increase more than a predetermined amount, an output potential appears on the lead 33.

The first and second outputs of each of the fault sensing circuits 300, 400, and 500 are all applied to the fault indicating circuit 600. The indicating circuit 600 contains a plurality of illuminable incandescent lamps 39 through 44 for indicating which of the voltage regulators 13, 15 and 17 contain a fault and whether the fault causes the regulator output to be an under-voltage or an over-voltage. For example, when a fault in the low positive voltage regulator 13 causes its output to increase more than a predetermined amount, the potential appearing on the output lead 33 of the fault sensing circuit 500 will illuminate the incandescent lamp 39. Conversely, when the lamp 40 is illuminated it indicates a fault in the low positive voltage regulator 13 which causes an under-voltage. Accordingly, the illumination of the lamp 41 indicates an over-voltage fault in the high positive voltage regulator 15 and the illumination of the lamp 42 indicates an under-voltage fault in this regulator. Also, the illumination of the lamp 43 indicates an over-voltage fault in the negative voltage regulator 17 and illumination of the lamp 44 indicates an under-voltage fault in the negative regulator 17. The indicating circuit 600 contains a single ouput lead 45 upon which a potential or output voltage appears whenever an over-voltage or under-voltage fault signal is supplied to the indicating circuit 600 by any of the fault sensing circuits 300, 400 or 500.

The output lead 45 of the indicating circuit 600 is applied to a protecting circuit 700 which inhibits or disables each of the voltage regulator circuits 13, 15 and 17, whenever a potential appears on the lead 45. That is, when a fault occurs in at least one of the voltage regulators 13, 15 and 17 which causes either an over-voltage or an under-voltage in the regulator output, a potential appears on the line 45 which causes the protection circuit 700 to effectively short-circuit the regulated output of each of the voltage regulators 13, 15 and 17 thereby causing the regulators to turn off or go to zero voltage. The present invention, as illustrated in FIGURE 1, was designed to disable the voltage regulators 13, 15 and 17 five micro-seconds after a fault or malfunction in any of the voltage regulators caused its regulated output voltage to vary more than a predetermined amount. This high speed of operation protects the circuits and circuit components in the utilizing device 21 which may be damaged by a fault occurring in any of the voltage regulators 13, 15 and 17.

In order to more fully protect the circuits and components in the utilizing device 21, it may be necessary, in the event of a power system malfunction, to inhibit or disable the voltage regulators 13, 15 and 17 sequentially. For example, it may be desirable to render the positive and negative voltage regulators inoperative before disabling the low voltage regulator which may provide bias potentials for various circuits and components in the utilization device 21. In order to accomplish this a sequencing off circuit 800, illustrated in dotted line form in FIGURE 1, is associated with the protection circuit 700. The sequencing off circuit 800 is activated by applying a potential to the lead 48 by way of the terminal 47. In response to such a potential, the sequencing off circuit 800 will disable the voltage regulators 13, 15 and 17 in a predetermined sequence and will also apply a potential, by way of the lead 49, to each of the fault sensing circuits 300, 400, and 500 to prevent an under-voltage fault signal being applied to the indicating circuit 600 as the voltage regulators 13, 15 and 17 are sequentially disabled. The potential applied to terminal 47 may be derived from a high speed alternating current power fault sensing system such as is disclosed in a copending application entitled High Speed Alternating Current Fault Sensing, filed September 18, 1962, Serial No. 224,344, and assigned to the assignee of the present invention.

The operation of the embodiment of the present invention shown in FIGURE 1 is such that in the absence of a fault or malfunction in the voltage regulators 13, 15 and 17, no potential appears on the output leads 33 through 38 of the fault sensing circuits 300, 400 and 500. Assume, however, that a fault occurs in the high positive voltage regulator 15 which causes its regulated output voltage to increase. Whenever the high positive regulated output voltage appearing on the lead 28 becomes more positive than the magnitude of the over-voltage reference level appearing on the lead 27, the high positive fault sensing circuit 300 produces an output or potential level on the lead 35. This potential is applied to the indicating circuit 600 and will illuminate the incandescent lamp 41 which gives a visual indication that the high positive voltage regulator 15 contains a malfunction which causes an over-voltage in the regulator output appearing on the lead 19. The potential on the lead 35 is also applied to the protection circuit 700 by way of the lead 45 and causes the protection circuit simultaneously to disable each of the voltage regulators 13, 15 and 17 by applying substantially a short circuit across their outputs.

Assume now that a fault or malfunction occurs in the negative voltage regulator 17 which causes the magnitude of the regulated voltage appearing on the lead 20 to decrease. When the magnitude of the regulated negative voltage appearing at the negative fault sensing circuit 400 by way of the lead 31 becomes less negative than the magnitude of the under-voltage reference level applied to the negative fault sensing circuit by way of the lead 32, the fault sensing circuit 400 causes an output or potential to appear on the lead 38 which will cause the incandescent lamp 44 to illuminate. The illumination of the lamp 44 indicates a fault in the negative fault regulator 17 which causes its regulated output voltage to become less negative than a predetermined amount. The potential appearing on the lead 38 is also applied to the protection circuit 700 by way of the lead 45. In response to this potential the protection circuit will simultaneously disable each of the voltage regulators 13, 15 and 17. Conversely, the present invention, as shown in FIGURE 1, will operate in a like manner when other faults or malfunctions occur in any of the voltage regulators 13, 15 and 17.

Assume now that a fault occurs in the alternating current power system (not shown) which supplies the rectifiers 11. When this occurs, a potential will be applied to the terminal 47 actuating the sequencing off circuit 800 which will disable the fault sensing circuits 300, 400 and 500 and cause the voltage regulators 13, 15 and 17 to be sequentially disabled in a predetermined manner. As will be obvious to those skilled in the art, the potential applied to the protection circuit 700 by the lead 45, may also be coupled (not shown) to the terminal 47 whenever it is desirable to sequentially disable the voltage regulators 13, 15 and 17 whenever a fault occurs in at least one of them.

Figure 2:
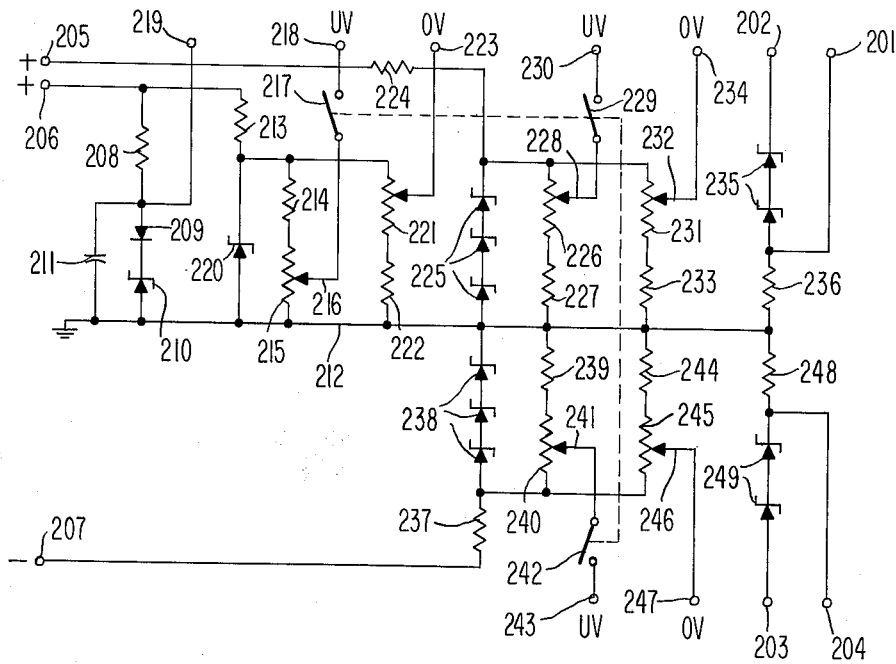
FIGURE 2 is a schematic illustration of a circuit which may be utilized as the voltage reference circuit of FIGURE 1.

FIGURE 2 illustrates a schematic diagram of a circuit which may be utilized as the voltage reference circuit 200 of FIGURE 1. Reference to FIGURE 2 shows a ground lead 212 to which is connected a plurality of voltage divider networks. In order to reduce the magnitude of the regulated output of the high voltage (six volts or more) regulator 15 of FIGURE 1, its output potential is coupled to a voltage divider network comprising the zener diodes 235 and the voltage dropping resistor 236 by way of terminal 202 which corresponds to the lead 23 of FIGURE 1. In as much as the voltage drop across the zener diodes 235 is constant, any variations in the regulated output appear across the resistor 236 and are also seen at the terminal 201. In like manner, in order to reduce the magnitude of the output voltage of the negative voltage regulator 17, its regulated output is coupled to the terminal 203, which corresponds to the lead 22 of FIGURE 1, through the zener diodes 249 and the resistor 248 to ground potential 212. Any variations in the magnitude of the regulated negative voltage appear across the resistor 248 and are also seen at the terminal 204. The regulated voltages, reduced in magnitude, seen at the terminals 201 and 204 are applied to the fault sensing circuits in a manner herein described below.

In order to obtain the low positive voltage (less than six volts) under-voltage and over-voltage reference level potentials, the unregulated rectified voltage appearing on lead 12 of FIGURE 1 is applied to the terminal 206 of FIGURE 2. Coupled to the terminal 206 is a voltage divider comprising the resistor 213 and temperature compensated zener diode 220. Connected in parallel with the zener diode 220 is a resistance network comprising the resistor 214 and the potentiometer 215. A constant voltage drop appears across the zener diode 220 which is also seen across the resistor 214 and the potentiometer 215. The wiper arm 216 of the potentiometer 215 is adjusted to provide an under-voltage reference level which appears on the terminal 218. For example, if the low positive regulator voltage is nominally +4 volts, the wiper arm 216 may be adjusted to provide a +3.5 volts at the terminal 218. In parallel with the resistor 214 and the potentiometer 215 is another potentiometer 221 and resistor 222. The wiper arm of the potentiometer 221 is adjusted to provide an over-voltage reference level at the terminal 223 which, for the example given above, may be +4.5 volts.

Also, coupled to the terminal 206 is another voltage divider network comprising the resistor 208, the diode 209 and the temperature compensated zener diode 210. The stable voltage appearing across the diode 209 and the zener diode 210 is applied to the terminal 219 to provide a stable low positive voltage source the utilization of which will be discussed in detail herein below. The capacitor 211, connected in parallel across the diode 209 and the zener diode 210, shunts any voltage transients that may occur to ground and thus prevents them from appearing on the stable positive voltage level seen at the terminal 219.

The unregulated rectified voltage appearing on the lead 14 of FIGURE 1 may be coupled to the terminal 205 of FIGURE 2. Coupled to the terminal 205 is a voltage divider network comprising the resistor 224 and a plurality of temperature compensated zener diodes 225. In parallel with the zener diodes 225 is a potentiometer 226 and a resistor 227 for providing the high positive under-voltage reference level at the terminal 230. Also in parallel with the zener diodes 225 is a potentiometer 231 and a resistor 233 for providing the high positive over-voltage reference level at the terminal 234. The over-voltage and under-voltage reference level can be adjusted by changing the relative position of the wiper arms 228 and 232 of potentiometers 226 and 231, respectively. Depending upon the under and over-voltage reference levels used, the terminals 205 and 206 may also be commonly connected to the unregulated positive voltage appearing on the lead 12 or 14 of FIGURE 1.

The negative unregulated rectified voltage appearing on the lead 16 of FIGURE 1 may be applied to the terminal 207 of FIGURE 2. Coupled to the terminal 207 is a voltage divider network comprising the resistor 237 and the temperature compensated zener diodes 238. Connected in parallel with the zener diode 238 is a resistor 239 and a potentiometer 240 having a wiper arm 241 for adjusting the negative under-voltage reference level which appears at the terminal 243. Also connected in parallel with the zener diodes 238 is a resistor 247 and a potentiometer 245 having a wiper arm 246 for adjusting the negative over-voltage reference level which appears on terminal 247.

By utilizing temperature compensated zener diodes in the circuit of FIGURE 2, the over-voltage and under-voltage reference levels varied less than 0.2 volt over a 60° C. temperature variation. In as much as only 0.5 milliamp flowing in or out of the potentiometers was required to cause sensing of a fault, the voltage reference circuit of FIGURE 2 was designed as a low power source. Relay contacts 217, 229, and 242 are utilized to momentarily interrupt or disconnect the under-voltage reference circuits while the voltage regulators 13, 15 and 17 of FIGURE 1 are being turned on to prevent generating an erroneous under-voltage fault signal. Once the regulators are turned on and are supplying their nominal regulated voltage, the relay contacts 217, 219, and 229 are closed to supply under-voltage reference level potential to the fault sensing circuits 300, 400 and 500 of FIGURE 1.

Figure 3:
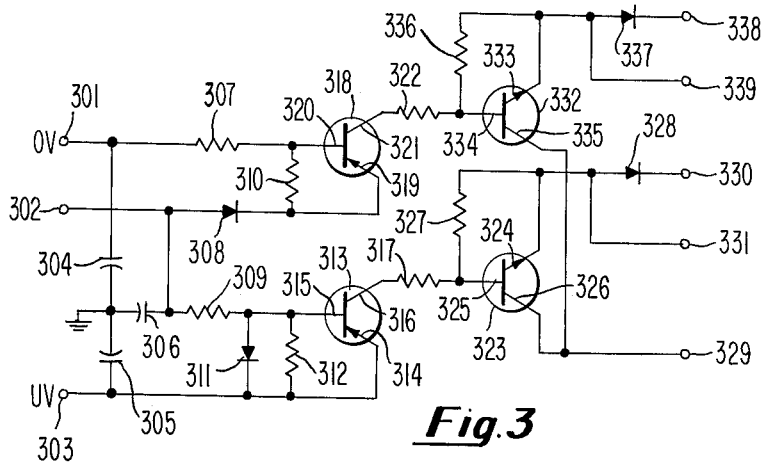
FIGURE 3 is a schematic illustration of a circuit which may be utilized as the high positive voltage fault sensing circuit of FIGURE 1.

FIGURE 3 shows a schematic diagram of a circuit which may be utilized as the high positive voltage fault sensing circuit 300 of FIGURE 1. Reference to FIGURE 3 shows that the fault sensing circuit comprises a first PNP transistor 318 and a second PNP transistor 313. The emitter 319 of the first PNP transistor 318 and the base 315 of the second PNP transistor 313 are coupled to a terminal 302 to which the positive regulated voltage, appearing on terminal 201 of FIGURE 2, is connected. The base 320 of the first PNP transistor 318 is coupled to the terminal 301 to which the high positive over-voltage reference level, appearing on terminal 234 of FIGURE 2, is connected. The emitter 314 of the second PNP transistor 313 is coupled to the terminal 303 to which the high positive under-voltage reference level, appearing on terminal 230 of FIGURE 2, is connected. Capacitors 304, 305 and 306 are connected between ground the terminals 301, 303 and 302 respectively and prevent transient noise that may occur, as appearing as a voltage fault. The collector 321 of the first PNP transistor 318 is coupled to the base 334 of a first NPN transistor 332 and the collector 316 of the PNP transistor 313 is connected to the base 325 of a second NPN transistor 323. The collectors 335, 326 of each of the NPN transistors 332 and 323 are connected to the terminal 329 to which a positive voltage, appearing on terminal 219 of FIGURE 2, is connected.

In the absence of a fault or a malfunction in the high positive voltage regulator 15 of FIGURE 1, the regulated potential appearing at terminal 302 is less positive than the over-voltage reference level appearing on the terminal 301. This prevents the diode 308 from conducting and also causes the PNP transistor 318 to be back biased and therefore non-conducting, which causes the NPN transistor 332 to also be non-conducting. Also, in the absence of a fault or malfunction, the regulated voltage level appearing on the terminal 302 is more positive than the under-voltage reference level appearing on the terminal 303 which causes the PNP transistor 313 to be back biased and therefore non-conducting which in turn causes the NPN transistor 323 to be non-conducting. Current will flow, however, through the resistor 309 and the diode 311. With the NPN transistors 332 and 323 non-conducting, no potential appears on the output terminals 338 and 330.

Assume now that a fault occurs in the positive voltage regulator 15 of FIGURE 1 which causes an over-voltage in the regulator output. The increase in regulator output voltage appears on the terminal 302 and when the magnitude of this voltage becomes more positive than the over-voltage reference level which appears on the terminal 301, current flows through the diode 308 through the resistor 310 and the resistor 307. Current also flows through the PNP transistor 318 which conducts in its saturation region, through the current limiting resistor 322, and the biasing resistor 336. Current also flows through the emitter 333 and base 334 diode of the NPN transistor 332 causing the transistor 332 to conduct in its saturation region. The positive voltage applied to the collector 335 of the NPN transistor 332, by way of the terminal 329, now appears on the terminal 338 with very little decrease in magnitude due to the small voltage drop across the diode 337 and the transistor 332 and is indicative of an over-voltage fault in the positive voltage regulator 15 of FIGURE 1.

Conversely, if a fault in the voltage regulator 15 of FIGURE 1 causes an under-voltage in its regulated output, the potential appearing at the terminal 302 becomes less positive than the under-voltage reference level appearing at terminal 303. This renders the diode 311 non-conducting and also causes the PNP transistor 313 to conduct in its saturation region which in turn causes the NPN transistor 323 to also conduct in its saturation region. Current flows from the terminal 303, through the biasing resistor 312, the emitter 314 and base 315 diode of the transistor 313, and through the current limiting resistor 309. Current also flows through the collector 316 of the PNP transistor 313, through the current limiting transistor 317, through the biasing resistor 327, and base 325 and emitter 324 diode of the transistor 323, through the collector 326, the diode 328, and to the terminal 330. Substantially all of the positive voltage applied to the terminal 329 now appears on the terminal 330 and is indicative of an under-voltage fault in the positive regulator 15 of FIGURE 1.

The operating speed of the circuit of FIGURE 3 is approximately one micro-second and provides a first output appearing on terminal 330 which is indicative of an under-voltage fault and a second on the terminal 338 which is indicative of an over-voltage fault.

Figure 4:
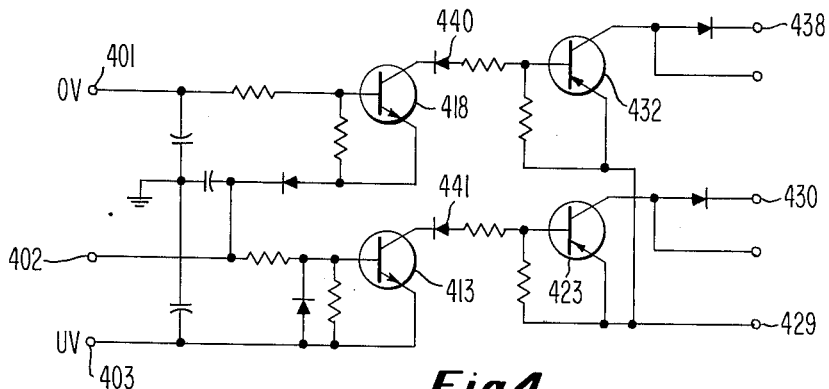
FIGURE 4 is a schematic illustration of a circuit which may be utilized as the negative voltage fault sensing circuit of FIGURE 1.

FIGURE 4 illustrates in schematic form a circuit which may be utilized as the negative fault sensing circuit 400 of FIGURE 1 and is seen to comprise two NPN transistors 418 and 413 and two PNP transistors 432 and 423. The positive voltage appearing on the terminal 219 of FIGURE 2 is applied to the terminal 429. The regulated negative voltage appearing on terminal 204 of FIGURE 2 is connected to terminal 402, the negative over-voltage reference level appearing on terminal 247 of FIGURE 2 is connected to terminal 401, and the negative under-voltage reference level appearing on terminal 243 of FIGURE 2 is connected to terminal 403.

The operation of the circuit of FIGURE 4 is substantially the same as the operation in FIGURE 3 described in detail herein above. That is, in the absence of a fault in the negative voltage regulator 400 of FIGURE 1, all the transistors 418, 413, 432, and 423 are non-conducting. When an over-voltage occurs due to a fault or malfunction, the NPN transistor 418 and the PNP transistor 432 conduct in their saturation region and substantially all the positive voltage appearing on the terminal 429 will appear on the terminal 438 indicating an over-voltage producing fault in the negative voltage regulator 15 of FIGURE 1. Conversely, an under-voltage producing fault will cause the NPN transistor 413 and the PNP transistor 423 to conduct in their saturation region thereby causing substantially all of the positive voltage appearing on terminal 429 to also appear on the terminal 430 indicating an under-voltage fault in the negative voltage regulator 17. The diodes 440 and 441 of FIGURE 4 prevent inverse voltages from damaging the transistors 418, 413, 432, and 423. The operating speed of the circuit of FIGURE 4 is also approximately one microsecond.

Figure 5:
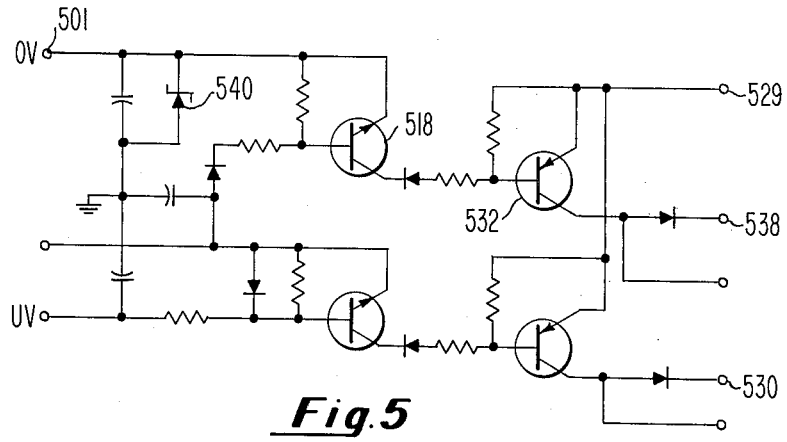
FIGURE 5 is a schematic illustration of a circuit which may be utilized as the low positive voltage fault sensing circuit of FIGURE 1.

FIGURE 5 illustrates a schematic diagram of a circuit which may be utilized as the low positive voltage sensing circuit 500 of FIGURE 1. The operation of the circuit of FIGURE 5 is substantially identical to the operation of the circuits shown in FIGURE 3 and FIGURE 4 and thus will not be described in detail herein. However, it should be stated that the zener diode 540 prevents the positive over-voltage reference level appearing on the terminal 501 from becoming more positive than the positive potential appearing on the terminal 538 which would prevent conduction of the transistors 518 and 532.

Figure 6:
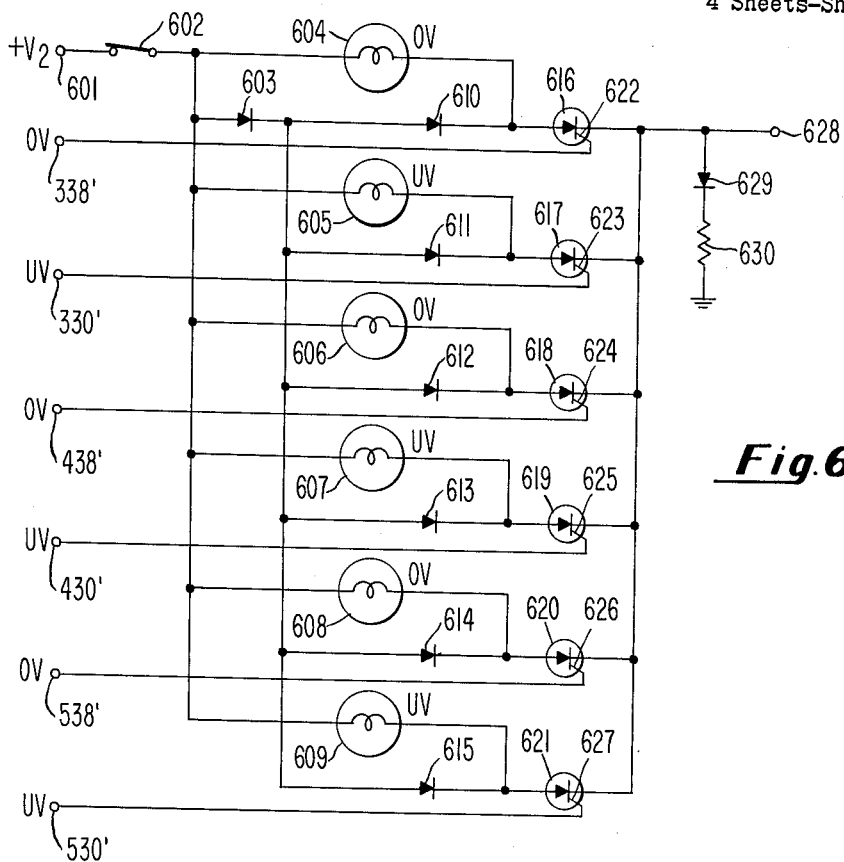
FIGURE 6 is a schematic illustration of a circuit which may be utilized as the indicating circuit of FIGURE 1.

FIGURE 6 illustrates a schematic diagram of a circuit which may be utilized as the indicating circuit 600 of FIGURE 1. Reference to FIGURE 6 shows that the circuit comprises a plurality of incandescent lamps 604 through 609. Associated with each incandescent lamp is an isolation and voltage dropping diode 610 through 615 and a controlled rectifier 616 through 621. Each incandescent lamp 604 through 609 is commonly connected, by way of a switch 602, to a terminal 601 to which a positive potential, which may be the unregulated rectified voltage appearing on the lead 12 of FIGURE 1, is applied. The gate element 622 through 627 of each of the plurality of controlled rectifiers 616 through 621 are coupled to the under-voltage and over-voltage output terminals of the fault sensing circuits illustrated in FIGURES 3, 4, and 5. For example, terminals 338′ and 330′ are connected to terminals 338 and 330 of FIGURE 3 respectively, terminals 438′ and 430′ are connected to terminals 438 and 430 respectively of FIGURE 4, and terminals 538′ and 530′ are connected to terminals 538 and 530 respectively of FIGURE 5.

The operation of the circuit in FIGURE 6 is such that when a potential appears on either of the two output terminals of any one of the fault sensing circuits shown in FIGURES 3, 4, and 5 due to a fault in one of the voltage regulators 13, 15 and 17 of FIGURE 1, the potential is also seen on the corresponding terminal of FIGURE 6 which causes current to flow from that terminal through the corresponding gate 622 through 627, through the corresponding controlled rectifier 616 through 621, and through the diode 629 and resistor 630 to ground which provides an output potential at the terminal 628. For example, consider that the PNP transistor 313 and NPN transistor 323 of FIGURE 3 conduct in their saturation region due to an under-voltage fault in the positive voltage regulator 15 of FIGURE 1, the positive voltage seen on the terminal 330 of FIGURE 3 is also seen on the terminal 330′ of FIGURE 6 and the complete current path is from the NPN transistor 323 of FIGURE 3, through the terminal 330′ of FIGURE 6, through the now fired rectifier 617, and through the diode 629 and resistor 630 to ground. That is, a potential appearing on either of the two output terminals of the fault sensing circuits causes one of the controlled rectifiers 616 through 621 to fire and thereby establishes a current path to ground through the diode 629 and resistor 630 for that particular fault sensing circuit.

Conduction of the controlled rectifier 617 causes current to flow from the terminal 601, through the switch 602, through the voltage dropping diode 603, and through the diode 611. The voltage drop across the diodes 603 and 611 appears across the incandescent lamp 605 illuminating it, which gives a visual indication that a fault has occurred in the positive voltage regulator 15 of FIGURE 1 which causes an under-voltage in its regulated output. Conversely, if an over-voltage occurs due to a fault in the negative voltage regulator 15 of FIGURE 1, current flows from the terminal 438′ and fires the control rectifier 618 which produces an output voltage on the terminal 628 and illuminates the incandescent lamp 606 which gives a visual indication of an over-voltage fault in the negative voltage regulator 17 of FIGURE 1. It is clear then, that the illumination of any one of the incandescent lamps 604 through 609 provides an indication of which of a plurality of voltage regulators contain a fault and whether the fault causes an under-voltage or an over-voltage in the regulator output.

As will be described in detail herein below, all of the voltage regulators 13, 15 and 17 will be disabled in response to the potential that appears on the terminal 628. In order to prevent all of the incandescent lamps being illuminated as their respective regulators are disabled, the positive voltage applied to terminal 601 is sufficiently positive that when one of the controlled rectifiers 616 through 621 is fired and its associated incandescent lamp 604 through 609 illuminated due to a fault in one of the voltage regulators 13, 15 and 17 FIGURE 1, the remaining control rectifiers 616 through 621 cannot be fired by an under-voltage fault signal supplied by the remaining fault sensing circuits. It is clear from the circuit of FIGURE 6, that after one of the controlled rectifiers 616 through 621 is fired, the positive potential appearing at the cathode of the fired controlled rectifier is also seen at the cathodes of all of the remaining unfired controlled rectifiers. As long as this potential is sufficiently more positive than the positive potential which may be applied to the gate elements 622 through 627 of the remaining unfired rectifiers 616 through 621 from the remaining fault sensing circuits, none of the remaining unfired controlled rectifiers can be fired, that is, rendered conductive. In this manner, only one of the plurality of incandescent lamps 604 through 609 will be illuminated after all of the voltage regulators 15, 13 and 17 of FIGURE 1 are disabled due to an under-voltage or over-voltage fault that occurs in only one of the voltage regulators. The one illuminated incandescent lamp 604 through 609 identifies which of the voltage regulators 13, 15 and 17 of FIGURE 1 contain a fault or malfunction and also indicates whether the fault caused an under-voltage or an over-voltage in the regulator output. Thus, trouble shooting and maintenance is reduced to a minimum. In order to reset a fired controlled rectifier 616 through 621 and thereby extinguish its associated illuminated incandescent lamp 604 through 609, the switch 602 is opened thereby rendering any fired controlled rectifier non-conducting which also extinguishes any illuminated lamp 604 through 609. The speed of operation of the circuit shown in FIGURE 6 is approximately two micro-seconds.

Figure 7:
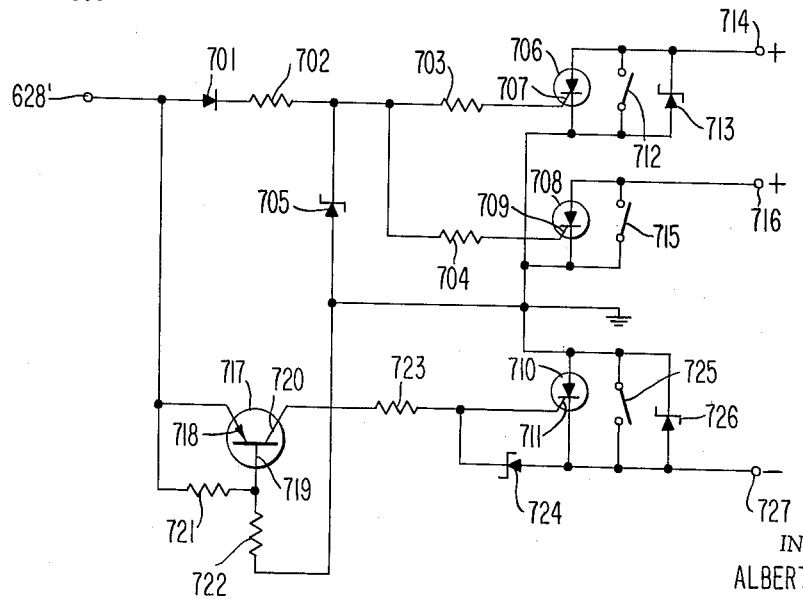
FIGURE 7 is a schematic illustration of a circuit which may be utilized as the protection circuit of FIGURE 1.

Referring now to the schematic diagram of FIGURE 7 there is shown a circuit which may be utilized as the protection circuit 700 of FIGURE 1 wherein the terminal 714 is connected to the output of the high positive voltage regulator 15 of FIGURE 1 and corresponds to the lead 52 of FIGURE 1. Terminal 716 is coupled to the output of the low positive voltage regulator 13 and corresponds to the lead 51 of FIGURE 1 while terminal 727 is coupled to the negative voltage regulator 17 of FIGURE 1 and corresponds to lead 50 of FIGURE 1. The controlled rectifiers 706, 708, and 710 are fired whenever a potential appears on the terminal 628′ which is indicative of a fault in at least one of the voltage regulators 13, 15 and 17. When the controlled rectifiers 706, 708 and 710 are fired they conduct heavily and present substantially a short circuit to the voltage regulator to which they are connected thereby causing the voltage regulator to turn off or to go to zero. The PNP transistor 717 isolates the control rectifier 710 from the terminal 628′ so that controlled rectifier 710 will not fire because of small leakage currents appearing at terminal 628′ even when a fault does not exist.

The operation of the circuit shown in FIGURE 7 is such that in the absence of any potential appearing on the terminal 628′ the PNP transistor 717 and the controlled rectifiers 706, 708 and 710 are non-conducting. Whenever a fault occurs in any one of the voltage regulators 13, 15, and 17 of FIGURE 1, a positive potential, which appears at the terminal 628 of FIGURE 6 in a manner as described in detail hereinabove, also appears at the terminal 628′ of FIGURE 7. This potential causes current to flow through the emitter 718 and base 719 diode of the PNP transistor 717, through the biasing resistor 721, through the current limiting resistor 722 to ground, through the collector 720 of the PNP transistor 717, through the voltage dropping resistor 723, and through the gate element 711 of the controlled rectifier 710 which causes the controlled rectifier 710 to fire, that is, conduct heavily. The fired controlled rectifier 710 presents a substantially short circuit to the negative voltage regulator output to which the terminal 727 is connected thereby causing the negative voltage regulator to turn off or go to zero. At the same time, current also flows through the diode 701 the resistor 702 and resistors 703 and 704 to the gate elements 707 and 709 of the controlled rectifiers 706 and 708 respectively. This fires the controlled rectifiers 706 and 708 thereby producing substantially a short circuit across the high positive and low positive voltage regulators 13 and 15 respectively of FIGURE 1 causing them to turn off or go to zero. As is well known to those skilled in the art, many voltage regulators in use at the present time are designed to turn off whenever a substantially short circuit occurs at their output.

The zener diode 705 prevents the voltage appearing at the gates 707 and 709 of the controlled rectifiers 705 and 706 respectively from exceeding a value which may damage the controlled rectifiers 706 and 708. The zener diode 724 serves the same function for the controlled rectifier 710. The operating speed of the circuit shown in FIGURE 7 is approximately two micro-seconds. As was discussed hereinabove, the speed of the fault sensing circuits illustrated in FIGURES 3, 4, and 5 have an operating speed of one micro-second and the recording circuit of FIGURE 6 has an operating speed of two micro-seconds. Accordingly, only five micro-seconds elapse between the time that an over-voltage occurs in the output of one of the voltage regulators 13, 15 and 17 until the voltage regulators are disabled by the protection circuit of FIGURE 7. The zener diodes 713 and 726 prevent excessive over-voltages that may occur from damaging load circuits during this five micro-second interval until the controlled rectifiers 706 and 710 fire. The switches 712, 715 and 725 are closed, thereby shorting-out the controlled rectifiers 706, 708 and 710 respectively to render them non-conducting again, to reset the protection circuit.

Figure 7A:
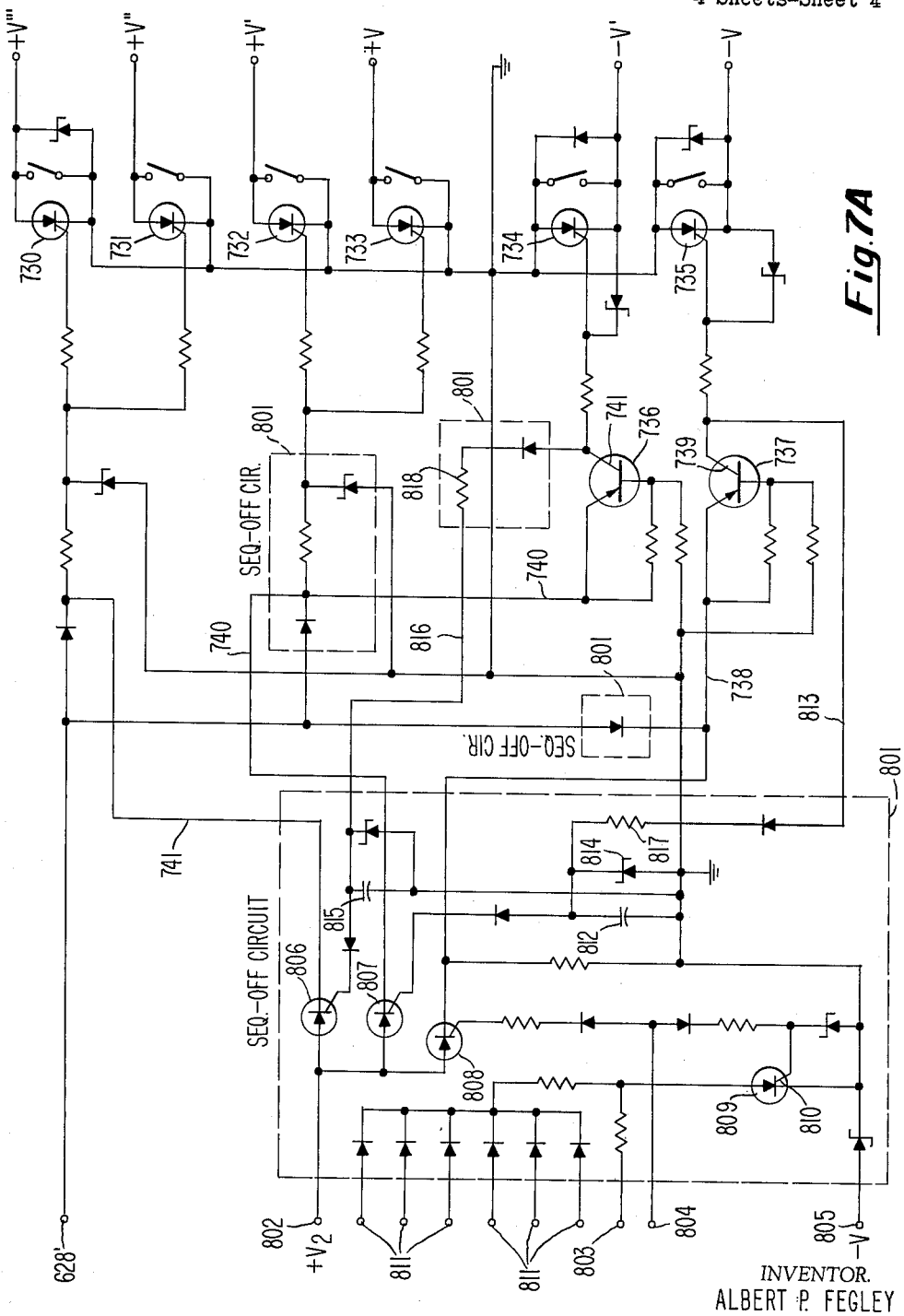
FIGURE 7A is a schematic illustration of a circuit which may be utilized as the protection and sequencing off circuit of FIGURE 1.

There is shown in FIGURE 7A a protection circuit such as that illustrated in FIGURE 7 containing a sequencing off circuit which is illustrated within the dotted outlines 801. As is clear from a perusal of FIGURE 7A the sequencing off circuit 801 is intimately interconnected with the protection circuit. In order to more clearly point out and describe the function of the sequencing off circuit, a protection circuit is illustrated which is capable of rendering five voltage regulators inoperative. For example, positive regulated voltages $+V'''$, $+V''$, $+V'$ and $+V$ are associated with the controlled rectifiers 730, 731, 732, and 733 respectively and negative regulated voltages $-V'$ and $-V$ are associated with the controlled rectifiers 734 and 735, respectively. The terminal 628' is coupled to the terminal 628 of the recording circuit illustrated in FIGURE 6. The terminal 802 is connected to a source of positive potential which may be the unregulated positive rectified voltage appearing on line 12 of FIGURE 1. The terminal 803 is connected to the source of positive potential which appears on the terminal 219 of the circuit shown in FIGURE 2 and insures that the controlled rectifier 809 can be fired, and once fired, will continue to conduct current until it is turned off. The terminal 805 is coupled to a source of negative voltage which may be the unregulated negative rectified voltage appearing on the lead 16 of FIGURE 1. The sequencing off signal is a positive potential which is applied to the terminal 804 which corresponds to the terminal 47 of FIGURE 1.

The circuit of FIGURE 7A is so designed that when a positive potential appears on the terminal 804, the negative voltage regulator $-V$ is first disabled after which the negative voltage regulator $-V'$ and the positive voltage regulators $+V$ and $+V'$ are simultaneously disabled and then the two positive voltage regulators $+V''$ and $+V'''$ are simultaneously disabled. The operation of the circuit is such that in the absence of a positive potential on the terminals 804 and 628' the controlled rectifiers 730, 731, 732, 733, 734 and 735 are non-conducting, the PNP transistors 736 and 737 are non-conducting and the controlled rectifiers 806, 807, 808, and 809, are also non-conducting. When a positive potential is applied to the terminal 804 it is also seen on the gate element 810 of the controlled rectifier 809 causing it to fire, that is, to conduct heavily. Conduction of the control rectifier 810 causes the negative voltage seen on the terminal 805 to appear on the terminals 811. This negative voltage is applied to the fault sensing circuits to prevent them from generating fault signals as the plurality of voltage regulators are sequentially inhibited. For example, the negative potential appearing on the terminals 811 would be applied to the terminals 339, 329, 439, 429, 539, and 529 of FIGURES 3, 4, and 5 respectively.

The positive potential appearing on the terminal 804 also fires the controlled rectifier 808 which causes the positive potential appearing on the terminal 802 to be applied to the PNP transistor 737 by way of the lead 738 causing the PNP transistor 737 to conduct in its saturation region which fires the controlled rectifier 735 thereby disabling the negative voltage $-V$ regulator. The positive voltage appearing on the collector 739 of the PNP transistor 737 is also applied to the capacitor 812 by way of the lead 813. This causes the capacitor 812 to acquire a positive voltage charge the magnitude of which is limited by the zener diode 814. The capacitor 812 and the resistor 817 constitute RC time constant circuit means which determines how rapidly the positive charge is acquired by the capacitor 812. In a few micro-seconds the positive charge appearing on the capacitor 812 is of sufficient magnitude to fire the controlled rectifier 807 which causes the positive potential appearing on potential 802 to be applied to the PNP transistor 736 by way of the lead 740 causing the controlled rectifier 734 to fire thereby disabling the negative voltage $-V'$ regulator. Simultaneously this positive voltage causes the controlled rectifiers 732 and 733 to fire thereby disabling the positive voltage $+V'$ and $+V$ regulators. The positive voltage appearing on the collector 741 of the PNP transistor 736 is applied to the capacitor 815 by way of the lead 816. The capacitor 815 and the resistor 818 constitute an RC time constant means that determines how rapidly the capacitor 815 acquires a positive charge. After a few micro-seconds the charge on the capacitor 815 is sufficiently positive to fire the controlled rectifier 806 which applies the positive potential on the terminal 802 to the controlled rectifiers 730 and 731 by way of the lead 741. Conduction of the controlled rectifiers 730 and 731 disable the positive voltage regulators $+V'''$ and $+V''$ respectively.

The circuit of FIGURE 7A may be designed to provide only five micro-seconds between the sequencing steps. As will be obvious to those skilled in the art, the sequencing steps, the number of sequencing steps, and the number of and the particular regulators disabled can be varied without departing from the scope of the present invention.

As will be obvious to those skilled in the art, the controlled rectifiers 730 through 735 may be used to disable circuits other than voltage regulators. For example, by connecting each of the controlled rectifiers 730 through 735 in parallel with one or more relay coils, they may be utilized to disable a relay system etc.

What has been described is a high speed apparatus for rapidly sensing a fault in one or more current regulators, indicating which direct current regulator contains a fault and whether the fault causes an under-voltage or an over-voltage in the regulator output. Protecting apparatus for protecting the circuits and circuit components supplied with power by the direct current regulator has also been described together with apparatus for simultaneously or sequentially disabling each direct current regulator whenever a fault or malfunction occurs in any one of them.

What is claimed is:
1. A high speed direct current voltage fault sensing apparatus comprising:
 a source of regulated direct current power,
 means for deriving direct current under-voltage and over-voltage reference levels, and
 sensing means including a constant level voltage source, a switching means connected thereto, and a first and a second output terminal alternately connected to said constant level voltage source by said switching means, said sensing means being coupled to said regulated voltage and adapted to receive said under-voltage and over-voltage reference levels for alternately providing the constant level voltage at said first output terminal only when the magnitude of said regulated voltage becomes less than the magnitude of said under-voltage reference level and for providing the constant level voltage at said second output terminal only when the magnitude of said regulated voltage becomes greater than the magnitude of said over-voltage reference level.

2. A high speed direct current voltage fault sensing apparatus comprising:

a source of regulated direct current power;
voltage divider means for deriving direct current under-voltage and over-voltage reference levels, and
semiconductor sensing means including a constant level voltage source, a switching means connected thereto, and a first and a second output terminal alternately connected to said constant level voltage source by said switching means, said sensing means being coupled to said regulated voltage and adapted to receive said under-voltage and over-voltage reference levels for providing the constant level voltage at said first output terminal only when the magnitude of said regulated voltage becomes less than the magnitude of said under-voltage reference level and for providing the constant level voltage at said second output terminal only when the magnitude of said regulated voltage becomes greater than the magnitude of said over-voltage reference level,
said constant level voltages at said first and second output terminals of said sensing means being indicative of a fault in said regulated power source.

3. A high speed direct current voltage fault sensing and indicating apparatus comprising:

a source of regulated direct current power;
means for deriving direct current under-voltage and over-voltage reference levels;
sensing means, including a constant level voltage source, a switching means connected thereto, and a first and a second output terminal alternately connected to said constant level voltage source by said switching means, said sensing means being coupled to said regulated voltage and adapted to receive said under-voltage and over-voltage reference levels for providing the constant level voltage of said first output terminal only when the magnitude of said regulated voltage becomes less than the magnitude of said under-voltage reference level and for providing constant level voltage at said second output terminal only when the magnitude of said regulated voltage becomes greater than the magnitude of said over-voltage reference level
whereby said constant level voltage at said first and second output terminals of said sensing means indicates a fault in said regulated power source; and
further means coupled to, and adapted to receive, the output of said sensing means for providing an indication whenever said regulated power source contains a fault of whether the fault causes an over-voltage or an under-voltage in the regulated power source.

4. A high speed direct current voltage fault sensing and indicating apparatus comprising:

a source of regulated direct current power;
voltage divider means for deriving adjustable direct current under-voltage and over-voltage reference levels;
semiconductor sensing means, including a constant level voltage source, a switching means connected thereto, and a first and a second output terminal alternately connected to said constant level voltage source by said switching means, said switching means being coupled to said regulated voltage and adapted to receive said under-voltage and over-voltage reference levels for providing a constant level voltage at said first output terminal only when the magnitude of said regulated voltage becomes less than the magnitude of said under-voltage reference level and for providing a constant level voltage at said second output terminal only when the magnitude of said regulated voltage becomes greater than the magnitude of said over-voltage reference level,
said constant level voltage at said first and second output terminals of said sensing means being indicative of a fault in said regulated power source; and
means, including a plurality of illuminable lamps, coupled to, and adapted to receive, the output of said sensing means for providing a visual indication whenever said regulated power source contains a fault and whether the fault causes an over-voltage or an under-voltage in the regulated power source.

5. A high speed direct current voltage fault sensing, indicating, and protecting apparatus comprising:

a source of regulated direct current power;
first means for deriving direct current under-voltage and over-voltage reference levels;
second means, including a constant level voltage source, a switching means connected thereto, and a first and a second output terminal alternately connected to said constant level voltage source by said switching means, said switching means being coupled to said regulated voltage and adapted to receive said under-voltage and over-voltage reference levels to provide a constant voltage output signal only when the magnitude of said regulated voltage becomes less than the magnitude of said under-voltage reference level or greater than the magnitude of said over-voltage reference level,
said constant voltage output of said second means being indicative of a fault in said regulated power source;
third means coupled to, and adapted to receive, the output of said second means for providing an indication whenever said regulated power source contains a fault of whether the fault causes an over-voltage or an under-voltage in the regulated power source; and
fourth means responsive to said output of said first means for disabling said regulated power source.

6. A high speed direct current voltage fault sensing, indicating, and protecting apparatus comprising:

a source of regulated direct current power;
means for deriving, from a relatively low power source, direct current under-voltage and over-voltage reference levels;
sensing means coupled to said regulated voltage and adapted to receive said under-voltage and over-voltage reference levels to provide a constant level voltage output signal only when the magnitude of said regulated voltage becomes less than the magnitude of said under-voltage reference level or greater than the magnitude of said over-voltage reference level;
said constant level voltage output signal of said sensing means being indicative of a fault in said regulated power source;
fault indicating means coupled to, and adapted to receive, the output of said sensing means for providing a visual indication whenever said fault causes an over-voltage or an under-voltage in the regulated power source; and
circuit protecting means including electronic switching means coupled to said fault indicating means wherein the faulty regulated voltages are electronically short-circuited until their regulated power sources are disabled.

7. A high speed direct current voltage fault sensing, indicating, and protecting apparatus comprising:

a source of regulated direct current power;

voltage divider means for deriving, from a relatively low power source, adjustable direct current under-voltage and over-voltage reference levels;

semiconductor sensing means coupled to said regulated voltage and adapted to receive said under-voltage and over-voltage reference levels to provide a constant voltage level output signal only when the magnitude of said regulated voltage becomes less than the magnitude of said under-voltage reference level or greater than the magnitude of said over-voltage reference level;

said constant voltage level output signal of said sensing means being indicative of a fault in said regulated power source;

full indicating means, including a plurality of illuminable devices, coupled to, and adapted to receive, the constant voltage level output signal of said sensing means for providing a visual indication, whenever said fault causes an over-voltage or an under-voltage in the regulated power source; and semiconductor circuit protecting means coupled to said indicating means and responsive to said output signal of said sensing means for disabling said regulated power source whenever a fault occurs in said regulated power source.

8. A high speed direct current voltage fault sensing, indicating, and protecting apparatus comprising:

a source of regulated direct current power;

first means for deriving direct current under-voltage and over-voltage reference levels;

second means having a first and second output terminal coupled to said regulated voltage and adapted to receive said under-voltage and over-voltage reference levels for providing a constant level signal voltage on said first output terminal only when the magnitude of said regulated voltage becomes less than the magnitude of said under-voltage reference level and to provide said constant level signal voltage on said second output terminal only when the magnitude of said regulated voltage becomes greater than the magnitude of said over-voltage reference level;

third means coupled to, the said first and second output terminals of said second means for providing an indication signal output whenever said regulated power source contains a fault caused by an over-voltage or an under-voltage in the regulated power source; and fourth means coupled to said third means and responsive to the said indication signal output of said third means for disabling said regulated power source.

9. A high speed direct current voltage fault sensing, indicating, and protecting apparatus comprising:

a source of regulated direct current power;

first means for deriving direct current under-voltage and over-voltage reference levels;

comparing means coupled to said regulated voltage and adapted to receive said under-voltage and over-voltage reference levels for providing a first direct current output signal level only when the magnitude of said regulated voltage becomes less than the magnitude of said under-voltage reference level and to provide a second output signal only when the magnitude of said regulated voltage becomes greater than the magnitude of said over-voltage reference level;

said first and second direct current output signals of said sensing means being indicative of a fault in said regulated power source;

second means coupled to, and adapted to receive, the first and second direct current output signals of said sensing means for providing a first indication signal whenever said regulated power source contains a fault which causes an over-voltage and a second indication signal whenever said fault causes an under-voltage in the regulated power source; and circuit protecting means coupled to said second means for disabling said regulated power source in response to either said first or said second fault indication signals.

10. A high speed direct current voltage fault sensing, indicating, and protecting apparatus comprising:

a source of regulated direct current power;

voltage divider means for deriving, from a relatively low power source, adjustable direct current under-voltage and over-voltage reference levels;

semiconductor sensing means having first and second output terminals coupled to said regulated voltage and adapted to receive said under-voltage and over-voltage reference levels for providing a constant voltage level signal at a first output terminal only when the magnitude of said regulated voltage becomes less than the magnitude of said under-voltage reference level and to provide said constant voltage level signal at said second output terminal only when the magnitude of said regulated voltage becomes greater than the magnitude of said over-voltage reference level;

the constant voltage signal from said first or second output terminals of said sensing means being indicative of a fault in said regulated power source;

means, including a plurality of illuminable devices coupled to, and adapted to receive, the output signal of said sensing means for providing a visual indication, whenever said regulated power source contains a fault, which also indicates whether the fault causes an over-voltage or an under-voltage in the regulated power source; and semiconductor circuit protecting means coupled to said indicating means for disabling said regulated power source whenever a fault occurs in said regulated power source.

11. A high speed direct current voltage fault sensing, indicating, and protecting apparatus comprising:

a plurality of power sources of regulated direct current voltage;

means for deriving direct current under-voltage and over-voltage reference levels to be compared with each of said regulated direct current voltage sources;

individual sensing means coupled to each of said regulated direct current voltage power sources and adapted to receive said under-voltage and over-voltage reference levels to provide a constant voltage output only when the magnitude of said regulated voltage becomes less than the magnitude of its said under-voltage reference level or greater than the magnitude of its said over-voltage reference level;

means coupled to said constant voltage output of each said sensing means for providing an indication signal of which of said regulated power source contains a fault and whether the fault causes an over-voltage or an under-voltage in the regulated power source; and means responsive to said indication signal output of said indicating means for electronically short circuiting all of said plurality of regulated power sources whenever a fault occurs in at least one of said plurality of regulated power sources.

12. The combination defined in claim 11 wherein each of said electronic short circuiting means includes:

a silicon controlled rectifier connected across each of said plurality of regulated power sources; all of said silicon controlled rectifiers commonly connected for control activation by a single output signal from said indicating means whereby the sensing of a single fault will simultaneously disable said plurality of regulated power sources at a disabling speed corresponding to the firing speed of said silicon controlled rectifiers.

13. A high speed direct current voltage fault sensing, indicating, and protecting apparatus comprising:

a plurality of power sources of regulated direct current voltage;

voltage divider means for deriving adjustable direct current under-voltage and over-voltage reference levels for each of said regulated direct current voltage sources;

individual comparing means coupled to each of said regulated direct current voltage power sources and adapted to receive said under-voltage and over-voltage reference levels to provide an output whenever the magnitude of said regulated voltage becomes less than the magnitude of said under-voltage reference level or greater than the magnitude of said over-voltage reference level;

said output of said sensing means being indicative of a fault in the associated regulated power source;

means coupled to, and adapted to receive, the output of each said sensing means for providing an indication of which of said regulated power source contains a fault and whether the fault causes an over-voltage or an under-voltage in the regulated power source;

circuit protecting means coupled to said indication means; and sequencing means associated with said circuit protecting means for sequentially disabling said plurality of regulated power sources in a predetermined manner in response to a signal applied thereto.

14. A high speed direct current voltage fault sensing, indicating, and protecting apparatus comprising:

a plurality of power sources of regulated direct current voltage;

voltage divider means for deriving, from a relatively low power source, adjustable direct current under-voltage and over-voltage reference levels for each said regulated direct current voltage source;

individual semiconductor sensing means coupled to each said regulated direct current voltage power source and adapted to receive said under-voltage and over-voltage reference levels for providing a constant voltage output signal whenever the magnitude of said regulated voltage becomes less than the magnitude of said under-voltage reference level or greater than the magnitude of said over-voltage reference level;

said constant voltage output of said sensing means being indicative of a fault in the associated regulated power source;

indicating means, including a plurality of illuminable devices, coupled to, and adapted to receive, the output of each said sensing means for providing a visual indication of which of said regulated power source contains a fault and whether the fault causes an over-voltage or an under-voltage in the regulated power source; and semiconductor circuit protecting means including a plurality of electronic switching means coupled to said indicating means and responsive to said output of said sensing means for simultaneously disabling all of said plurality of regulated power sources after a fault occurs in at least one of said plurality of regulated power sources in a time interval corresponding to the operational speed of an electronic switch.

15. The combination defined in claim 14 wherein each of said circuit protecting means includes:

a plurality of silicon controlled rectifiers, each having a firing control means, correspondingly and respectively connected across said plurality of regulated power sources, said control means of each of said rectifiers commonly connected to said indicating means to thereby enable the simultaneous disabling of all of said plurality of regulated power sources in an interval of time corresponding to the firing activation speed of said silicon controlled rectifiers.

16. The combination defined in claim 15 further including sequencing means associated with said circuit protecting means for sequentially inhibiting said plurality of regulated power sources in a predetermined manner in response to a signal applied thereto.

17. A high speed direct current voltage fault sensing, indicating, and protecting apparatus comprising:

a plurality of sources of regulated direct current voltage power;

means for deriving direct current under-voltage and over-voltage reference levels for each of said regulated direct current voltage sources;

sensing means having first and second terminals associated with each of said regulated direct current voltage power sources and adapted to compare its associated said regulated voltage level with said under-voltage and over-voltage reference levels to provide a constant voltage signal only at said first output terminal whenever the magnitude of said regulated voltage becomes less than the magnitude of said under-voltage reference level and to provide said constant voltage signal only at said second output terminal whenever the magnitude of said regulated voltage becomes greater than the magnitude of said over-voltage reference level;

said constant voltage output signal at either first or said second output terminal of each of said sensing means being indicative of a fault in the associated regulated power source which causes the voltage level of the regulated power source to decrease or increase more than a predetermined amount;

indicating means coupled to, and adapted to receive, the constant voltage output signal at either said first or second output of each sensing means for indicating which of said regulated power sources contains a fault and whether the fault is causing an over-voltage or an under-voltage in that regulated power source; and protecting means including silicon controlled rectifiers responsive to said outputs of said sensing means for disabling all of said plurality of regulated power sources whenever a fault occurs in at least one of said plurality of regulated power sources wherein said disabling is accomplished electronically rather than mechanically.

18. The combination defined in claim 17 wherein each of said indicating means includes:

a plurality of illuminating means, wherein said plurality is twice said plurality of regulated voltage sources to provide a visual indication of an over-voltage and an under-voltage fault condition for each of said plurality of voltage sources, and said indicating means further includes a plurality of silicon controlled rectifiers correspondingly and respectively connected to said plurality of illuminating means wherein the firing activation of any one of said rectifiers simultaneously causes the illumination of its respectively connected illuminating means and simultaneously provides a suitable bias voltage source to inhibit the firing activation of the remainder of said plurality of illuminating means.

19. A high speed direct current fault sensing, indicating and protecting apparatus comprising:

a plurality of regulated direct current voltage power;

voltage divider means for deriving adjustable direct current under-voltage and over-voltage reference levels for each of said regulated direct current voltage sources;

individual sensing means associated with each of said regulated direct current voltage power sources and adapted to compare its associated said regulated voltage level with said under-voltage and over-voltage reference levels to provide an output signal only when the magnitude of said regulated voltage becomes greater or less than the respective magnitudes of said over-voltage and under-voltage reference levels;

said output signal of said sensing means being indicative of a fault in the associated regulated power source which causes the voltage level of said regulated power source to decrease or increase more than a predetermined amount;

indicating means coupled to, and adapted to receive, the output of each sensing means for providing a plurality of fault indication signals denoting the faulty regulated power source, and the direction of said voltage variation resulting from said fault;

semiconductor protecting means coupled to said indicating means and responsive to any one of said plurality of indication signals therefrom; and sequencing means associated with said protecting means for sequentially inhibiting said plurality of regulated power sources in a predetermined manner in response to a signal applied thereto.

20. A high speed direct current voltage fault sensing, indicating and protecting apparatus comprising:

a plurality of sources of regulated direct current voltage power;

voltage divider means for deriving, from a relatively low power source, adjustable direct current under-voltage and over-voltage reference levels for each said regulated direct current voltage source;

individual semiconductor sensing means associated with each said regulated direct current voltage power source and adapted to compare its associated said regulated voltage level with said under-voltage and over-voltage reference levels to provide an output signal only when the magnitude of said regulated voltage becomes greater than or less than the magnitude of said respective over-voltage and under-voltage reference levels;

said output signal of said sensing means being indicative of a fault in the associated regulated power source which causes the voltage level of the regulated power source to decrease or increase more than a predetermined amount;

indicating means, including a plurality of illuminable devices, coupled to receive said output signal from each sensing means for visually indicating which regulated power source contains the fault and whether said fault is causing an over-voltage or an under-voltage condition therefrom;

semiconductor circuit protecting means coupled to said indicating means and responsive to activation of any of said plurality of illuminating devices of said indicating means; and a sequencing circuit, including time constant means associated with said protecting means for sequentially disabling said plurality of regulated power sources in a predetermined manner in response to a signal applied thereto.

References Cited by the Examiner
UNITED STATES PATENTS

| 2,356,055 | 8/1944 | Hodnette et al. | 317—14 X |
| 3,021,514 | 2/1962 | Regis et al. | 340—248 |

SAMUEL BERNSTEIN, *Primary Examiner.*